(12) United States Patent
Chen

(10) Patent No.: US 9,120,080 B2
(45) Date of Patent: Sep. 1, 2015

(54) ACETYLENE STORAGE USING METAL-ORGANIC FRAMEWORKS WITH OPEN METAL SITES

(75) Inventor: Banglin Chen, San Antonio, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 23 days.

(21) Appl. No.: 13/576,131

(22) PCT Filed: Feb. 10, 2010

(86) PCT No.: PCT/US2010/023773
§ 371 (c)(1),
(2), (4) Date: Oct. 19, 2012

(87) PCT Pub. No.: WO2011/099967
PCT Pub. Date: Aug. 18, 2011

(65) Prior Publication Data
US 2013/0035527 A1    Feb. 7, 2013

(51) Int. Cl.
B01J 20/22 (2006.01)
B01J 20/28 (2006.01)
C07C 7/20 (2006.01)
C10L 3/04 (2006.01)
F17C 11/00 (2006.01)

(52) U.S. Cl.
CPC ............ *B01J 20/226* (2013.01); *B01J 20/2808* (2013.01); *C10L 3/04* (2013.01); *F17C 11/002* (2013.01)

(58) Field of Classification Search
USPC .......................................................... 585/3
See application file for complete search history.

(56) References Cited

U.S. PATENT DOCUMENTS

| 2006/0252641 | A1* | 11/2006 | Yaghi et al. .................... 502/401 |
| 2007/0248852 | A1* | 10/2007 | Mueller et al. .................. 429/17 |
| 2007/0252641 | A1  | 11/2007 | Goodnow et al. ............. 327/543 |

FOREIGN PATENT DOCUMENTS

| JP | 2003-342260 | 12/2003 |
| JP | 2004-161675 | 6/2004 |
| JP | 2004-305985 | 11/2004 |
| WO | WO 2008/000694 | 1/2008 |

OTHER PUBLICATIONS

Xiang et al., Exceptionally high acetylene uptake in a microporous metal—organic framework with open metal sites, Aug. 10, 2009, J. Am. Chem. Soc., vol. 131, No. 34, pp. 12415-12419.*
Wu et al., High-capacity methane storage in metal—organic frameworks M2(dhtp): the important role of open metal sites, 2009, Journal of American Chemical Society, vol. 131, pp. 4995-5000.*
Xiao et al., High-capacity hydrogen and nitric oxide adsorption and storage in metal—organic framework, 2007, Journal of American Chemical Society, vol. 129, pp. 1203-1209.*

(Continued)

*Primary Examiner* — In Suk Bullock
*Assistant Examiner* — Youngsul Jeong
(74) *Attorney, Agent, or Firm* — Parker Highlander PLLC

(57) ABSTRACT

This invention provides, but is not limited to, methods of using metal-organic frameworks (MOFs) with open metal sites for acetylene storage. Also provided are compositions and materials comprising MOFs with open metal sites and acetylene, e.g., an acetylene storage material comprising HKUST-1 and acetylene.

5 Claims, 3 Drawing Sheets

(56) References Cited

OTHER PUBLICATIONS

Matsuda et al., Highly controlled acetylene accomodation in a metal—organic microporous material, Jul. 2005, Nature-Letters, vol. 436 (14), pp. 238-241.*
Babarao, et al, "Storage and separation of CO2 and CH4 in silicalite, C168 schwarzite, and IRMOF-1: a comparative study from Monte Carlo simulation," *Langmuir*, 23:659-66, 2007.
Bai, et al., "The designed assembly of augmented diamond networks from predetermined pentanuclear tetrahedral units," *Angew. Chem. Int. Ed. Engl.*, 47:5344-7, 2008.
Banerlee, et al., "Control of pore size and functionality in isoreticular zeolitic imidazolate frameworks and their carbon dioxide selective capture properties," *J. Am. Chem. Soc.*, 131:3875-7,2009.
Bauer, et al., "Influence of connectivity and porosity on ligand-based luminescence in zinc metal—organic framework," *J. Am. Chem. Soc.*, 129:7136-44, 2007.
Bourrelly, et al., "Different adsorption behaviors of methane and carbon dioxide in the isotypic nanoporous metal terephthalates MIL-53 and MIL-47," *J. Am. Chem. Soc.*, 127:13519-21, 2005.
Busker, ei al., "Isomer-selective vibrational spectroscopy of benzene-acetylene aggregates: comparison with the structure of the benzene-acetylene coctystal," *Angew. Chem. Int. Ed. Engl.*, 47:10094-7, 2008.
Britt, et al., "Highly efficient separation of carbon dioxide by a metal—organic framework replete with open metal sites," *PNAS*, 106:20637-40, 2009,.
Caskey, et al., "Dramatic tuning of carbon dioxide uptake via metal substitution in a coordination polymer with cylindrical pores," *J. Am. Chem. Soc.*, 130:10870-1, 2008.
Chandler, et al., "Microporous metal—organic frameworks formed in a stepwise manner from luminescent building blocks," *J. Am. Chem. Soc.*, 128:10403-12, 2006.
Chen, et al., "A luminescent microporous metal—organic framework for the recognition and sensing of anions," *J. Am. Chem. Soc.*, 6718-9, 2008.
Chen, et al., "A microporous metal—organic framework for gas-chromatographic separation of alkanes," *Angew. Chem. Int. Ed. Engl.*, 45:1390-3, 2006.
Chen, et al., "A triply interpenetrated microporous metal—organic framework for selective sorption of gas molecules," *Inorg. Chem.*, 46:8490-2, 2007.
Chen, et al., "High H2 adsorption in a microporous metal—organic framework with open metal sites," *Angew. Chem. Int. Ed. Engl.*, 44:4745-9, 2005.
Chen, et al., "Luminescent open metal sites within a metal—organic framework for sensing small molecules," *Adv. Mater.*, 19:1693-6, 2007.
Chen, et al., "Metal—organic frameworks with functional pores for recognition of small molecules," *Acc. Chem. Res.*, 43:1115-24, 2010.
Chen, et al., "Multiroute synthesis of porous anionic frameworks and size-tunable extraframework organic cation-controlled gas sorption properties," *J. Am. Chem. Soc.*, 131:16027-9, 2009.
Chen, et al., "Rationally designed micropores within a metal—organic framework for selective sorption of gas molecules," *Inorg. Chem.*, 46:1233-6, 2007.
Chen, et al., "Selective gas sorption within a dynamic metal—organic framework," *Inorg. Chem.*, 46:9705-9, 2007.
Chen, et al., "Surface interactions and quantum kinetic molecular sieving for H2 and D2 adsorption on a mixed metal—organic framework material," *J. Am. Chem. Soc.*, 130:6411-23, 2008.
Choi and Suh, "Highly selective $CO_2$ capture in flexible 3D coordination polymer networks," *Angew. Chem.*, 121:6997-7001, 2009.
Chui, et al., "A chemically functionalizable nanoporous material," *Science*, 283:1148-50, 1999.
Couck, et al., "An amine-functionalized MIL-53 metal—organic framework with large separation power for CO2 and CH4," *J. Am. Chem. Soc.*, 131:6326-7, 2009.
Czepirski and Jagiello, "Viral-Type Thermal Equation of Gas-Solid Adsorption," *Chem. Eng. Sci.*, 44:797-801, 1989.

Dietzel, et al., "Adsorption properties and structure of $CO_2$ adsorbed on open coordination sites of metal—organic framework $Ni_2(dhtp)$ from gas adsorption, IR spectroscopy and X-ray diffraction," *Chem. Commun.*, pp. 5125-5127, 2008.
Dietzel, et al., "An in situ high-temperature single-crystal investigation of a dehydrated metal—organic framework compound and field-induced magnetization of one-dimensional metal—oxygen chains." *Angew. Chem. Int. Ed.*, 44:6354-8, 2005.
Dietzel, et al., "Hydrogen adsorption in a nickel based coordination polymer with open metal sites in the cylindrical cavities of the desolvated framework," *Chem. Commun.*, 959-61, 2006.
Dietzel, et al., "Structural changes and coordinatively unsaturated metal atoms on dehydration of honeycomb analogous microporous metal-organic frameworks," *Chemistry*, 14:2389-97, 2008.
Dicãand Long, "Hydrogen storage in microporous metal—organic frameworks with exposed metal sites," *Angew. Chem. Int. Ed. Engl.*, 47:6766-79, 2008.
Dybtsev, et al., "A homochiral metal—organic material with permanent porosity, enantioselective sorption properties, and catalytic activity," *Angew. Chem. Int. Ed.*, 45:916-920, 2006.
Eddaoudi, et al., "Modular chemistry: secondary building units as a basis for the design of highly porous and robust metal—organic carboxylate frameworks," *Acc. Chem. Res.*, 34:319-30, 2001.
Eddaoudi, et al., "Porous metal—organic polyhedra: 25 A cuboctahedron constructed from 12 Cu2(CO2)4 paddle-wheel building blocks," *J. Am. Chem. Soc.*, 123:4368-9, 2001.
Eddaoudi, et al., "Systematic design of pore size and functionality in isoreticular MOFs and their application in methane storage," *Science*, 295:469-72, 2002.
Fang, et al., "A metal—organic framework with the zeolite MTN topology containing large cages of vol. 2.5 $nm^3$" *Angew. Chem. Int. Ed.*, 44:3845-8, 2005.
Fang, et al., "A multifunctional metal—organic open framework with a bcu topology constructed from undecanuclear clusters," *Angew. Chem.*, 118:6272-6, 2006.
Fang, et al., "Mesoporous metal—organic framework with rare etb topology for hydrogen strorage and dye assembly," *Angew. Chem.*, 119:6758-62, 2007.
Férey, "Hybrid porous solids: past, present, future," *Chem. Soc. Rev.*, 37:191-214, 2008.
Férey, et al., "Hydrogen adsorption in the nanoporous metal—benzenedicarboxylate M(OH)(O2C-C6H4-CO2) (M=A13+, Cr3+), MIL-53," *Chem. Commun.*, pp. 2976-2977, 2003.
Furukawa, et al., "Independent verification of the saturation hydrogen uptake in MOF-177 and establishment of a benchmark for hydrogen adsorption in metal—organic frameworks," *J. Mater. Chem.*, 17:3197-204, 2007.
Hermes, et al., "Selective nucleation and growth of metal—organic open framework thin films on patterned COOH/CF3-terminated self-assembled monolayers on Au(111)," *J. Am. Chem. Soc.*, 127:13744-5, 2005.
Hou, et al., "Porous metal—organic framework based on mu4-oxo tetrazinc clusters: sorption and guest-dependent luminescent properties," *Inorg. Chem.*, 47:1346-51, 2008.
Hu, et al., "A new MOF-505 analog exhibiting high acetylene storage," *Chem Commun.*, pp. 7551-7553, 2009.
Huang, et al., "Shape-selective sorption and fluorescent sensing of aromatics in a flexible network of tetrakis[(4-methylthiophenyl)ethynyl]silane and $AgBF_4$," *Chem. Mater.*, 21:541-6, 2009.
Hwang, et al., "Amine grafting on coordinatively unsaturated metal centers of MOFs: consequences for catalysis and metal encapsulation," *Angew. Chem. Int. Ed.*, 47:4144-8, 2008.
International Search Report and Written Opinion, issued in PCT/US2010/023773, dated Apr. 1, 2010.
Jagiello, et al., "Adsorption near ambient temperatures of methane, carbon tetrafluoride, and sulfur hexafluoride on commercial activated carbons," *J. Chem. Eng. Data.*, 40:1288, 1995.
Kesanli, et al., "Highly interpenetrated metal—organic frameworks for hydrogen storage," *Angew. Chem. Int. Ed. Engl.*, 44:72-5, 2004.
Kitagawa, et al., "Functional porous coordination polymers," *Angew. Chem. Int. Ed.*, 43:2334-75, 2004.

(56) References Cited

OTHER PUBLICATIONS

Koder, et al., "Design and engineering of an $O_2$ transport protein," *Nature*, 458:305-9, 2009.
Koh, et al., "A porous coordination copolymer with over 5000 m2/g BET surface area," *J. Am. Chem. Soc.*, 131:4184-5, 2009.
Lan, et al., "A luminescent microporous metal—organic framework for the fast and reversible detection of high explosives," *Angew. Chem. Int. Ed.*, 48:2334-8, 2009.
Lee, et al., "A comparison of the H2 sorption capacities of isostructural metal—organic frameworks with and without accessible metal sites: []Zn2(abtc)(dmf)2}3] and [{Cu2(abtc)(dmf)2}3] versus [{Cu2(abtc)}3]," *Agnew. Chem. Int. Ed.*, 47:7741-5, 2008.
Lee, et al., "Synthesis and gas sorption properties of a metal—azolium framework material," *Inorg. Chem.*, 48:9971-3, 2009.
Li, et al., "Design and synthesis of an exceptionally stable and highly porous metal—organic framework," *Nature*, 402:276-9, 1999.
Lim, et al., "Cucurbit[6]uril: organic molecular porous material with permanent porosity, exceptional stability, and acetylene sorption properties," *Agnew. Chem.*, 120:3400-03, 2008.
Lin, et al., "High capacity hydrogen adsorption in Cu(II) tetracarboxylate framework materials: the role of pore size, ligand functionalization, and exposed metal sites," *J. Am. Chem. Soc.*, 131:2159-71, 2009.
Lin, et al., "Hydrogen, methane and carbon dioxide adsorption in metal—organic framework materials," *Top Curr. Chem.*, 293:35-76, 2010.
Lin, et al., "Modular synthesis of functional nanoscale coordination polymers," *Angew. Chem. Int. Ed.*, 48:650-8, 2009.
Liu, et al., "Increasing the density of adsorbed hydrogen with coordinatively unsaturated metal centers in metal-organic frameworks," *Langmuir*, 24:4772-7, 2008.
Liu, et al., "Metal—organic framework as a template for porous carbon synthesis," *J. Am. Chem. Soc.*, 130:5390-1, 2008.
Ma and Lin, "Unusual interlocking and interpenetration lead to highly porous and robust metal—organic frameworks," *Angew. Chem. Int. Ed.*, 48:3637-40, 2009.
Ma, et al., "Framework—Catenation Isomerism in MOFs and Its Impact on Hydrogen Uptake," *J. Am. Chem. Soc.*, 129:1858-9, 2007.
Ma, et al., "Further investigation of the effect of framework catenation on hydrogen uptake in metal—organic frameworks," *J. Am. Chem. Soc.*, 130:15896-902, 2008.
Ma, et al., "Metal—organic framework from an anthracene derivative containing nanoscopic cages exhibiting high methane uptake," *J. Am. Chem. Soc.*, 130:1012-6, 2008.
Matsuda, et al., "Highly controlled acetylene accommodation in a metal—organic microporous material," *Nature*, 436:238-41, 2005.
McKinlay, et al., "Exceptional behavior over the whole adsorption-storage-delivery cycle for NO in porous metal organic frameworks," *J. Am. Chem. Soc.*, 130:10440-10444, 2008.
Millward and Yaghi, "Metal—organic frameworks with exceptionally high capacity for storage of carbon dioxide at room temperature," *J. Am. Chem. Soc.*, 127:17998-9, 2005.
Morris and Wheatley, "Gas storage in nanoporous materials," *Angew. Chem. Int. Ed.*, 47:4966-81, 2008.
Mu, et al., "A novel metal—organic coordination polymer for selective adsorption of $CO_2$ over $CH_4$;" *Chem. Commun.*, pp. 2493-2495, 2009.
Mulfort and Hupp, "Chemical reduction of metal—organic framework materials as a method to enhance gas uptake and binding," *J. Am. Chem. Soc.*, 129:9604-5, 2007.
Myers and Prausnitz, "Thermodynamics of mixed-gas adsorption," *AIChE J.*, 11:121-7, 1965.
Nelson, et al., "Supercritical processing as a route to high internal surface areas and permanent microporosity in metal—organic framework materials," *J. Am. Chem. Soc.*, 131:458-60, 2009.
Noro, et al., "A new, methane adsorbent, porous coordination polymer," *Angew. Chem. Int. Ed. Engl.*, 39:2081-4, 2000.
Park, et al., "Exceptional chemical and thermal stability of zeolitic imidazolate frameworks," *Proc. Natl. Acad. Sci. USA*, 103:10186-91, 2006.

Reid and Thomas, "Adsorption kinetics and size exclusion properties of probe molecules for the selective porosity in a carbon molecular sieve used for air separation," *J. Phys. Chem. B.*, 105:10619-29, 2001.
Reid and Thomas, "Adsorption of gases on a carbon molecular sieve used for air separation: linear adsorptives as probes for kinetic selectivity," *Langmuir*, 15:3206-18, 1999.
Rieter, et al., "Nanoscale coordination polymers for platinum-based anticancer drug delivery," *J. Am. Chem. Soc.*, 130:11584-5, 2008.
Rosi, et al., "Hydrogen storage in microporous metal—organic frameworks." *Science*, 300:1127-9, 2003.
Rosi, et al., "Rod packings and metal—organic frameworks constructed from rod-shaped secondary building units," *J. Am. Chem. Soc.*, 127:1504-18, 2005.
Roswell and Yaghi, "Effects of functionalization, catenation, and variation of the metal oxide and organic linking units on the low-pressure hydrogen adsorption properties of metal—organic frameworks," *J. Am. Chem. Soc.*, 128:1304-15, 2006.
Samsonenko, et al., "Microporous magnesium and manganese formates for acetylene storage and separation," *Chem. Asian J.*, 2:484-8, 2007.
Seo, et al., "A homochiral metal—organic porous material for enantioselective separation and catalysis," *Nature*, 404:982-6, 2000.
Serre, et al. "Role of solvent-host interactions that lead to very large swelling of hybrid frameworks," *Science*, 315:1828-31, 2007.
Shimomura, et al., "Porous coordination polymers towards gas technology," *Struct. Bond*, 132:51-86, 2009.
Spek, "Single-crystal structure validation with the program PLATON," *J. Appl. Cryst.*, 36:7-13, 2003.
Stang and Diederich, In: *Modern Acetylene Chemistry*, VCH, New York, 1995.
Tanaka, et al., "Anthracene array-type porous coordination polymer with host-guest charge transfer interactions in excited states," *Chem. Commun.*, pp. 3142-3144, 2007.
Tanaka, et al., "Storage and sorption properties of acetylene in jungle-gym-like open frameworks," *Chem. Asian J.*, 3:1343-9, 2008.
Thallapally, et al., "Flexible (breathing) interpenetrated metal—organic frameworks for $CO_2$ separation applications," *J. Am Chem. Soc.*, 130:16842-3, 2008.
Thomas, "Adsorption and desorption of hydrogen on metal—organic framework materials for storage applications: comparison with other nanoporous materials," *Dalton Trans.*, 1487-1505, 2009.
Thomas, "How far is the concept of isolated active sites valid in solid catalysts?" *Top Catal.*, 50:98-105, 2008.
Vitillo, et al., "Role of exposed metal sites in hydrogen storage in MOFs," *J. Am. Chem. Soc.*, 130:8386-96, 2008.
Wang, et al., "Bottom-up synthesis of porous coordination frameworks: apical substitution of a pentanuclear tetrahedral precursor," *Angew. Chem. Int. Ed.*, 48:5291-5, 2009.
Wang, et al., "Enhancing $H_2$ uptake by "close-packing" alignment of open copper sites in metal—organic framework," *Angew. Chem. Int. Ed.*, 47:7263-6, 2008.
Welbes and Borovik, "Confinement of metal complexes within porous hosts: development of functional materials for gas binding and catalysis," *Acc. Chem. Res.*, 38:765-74, 2005.
Wu, et al., "High-capacity methane storage in metal—organic frameworks M2(dhtp): the important role of open metal sites," *J. Am. Chem. Soc.*, 131:4995-5000, 2009.
Xiang, et al., "Exceptionally high acetylene uptake in a microporous metal—organic framework with open metal sites," *J. Am. Chem. Soc.*, 131:12415-9, 2009.
Xiang, et al., "Open metal sites within isostructural metal—organic frameworks for differential recognition of acetylene and extraordinarily high acetylene storage capacity at room temperature," *Angew. Chem. Int. Ed. Engl.*, 49:4615-8, 2010.
Xiao, et al., "High-capacity hydrogen and nitric oxide adsorption and storage in a metal—organic framework," *J. Am. Chem. Soc.*, 129:1203-9, 2007.
Xu, et al., "Robust metal—organic framework enforced by triple-framework interpenetration exhibiting high H2 storage density," *Inorg. Chem.*, 47:6825-8, 2008.
Xue, et al., "New prototype isoreticular metal—organic framework $Zn_4O(FMA)_3$ for gas storage," *Inorg. Chem.*, 48:4649-51, 2009.

(56) References Cited

OTHER PUBLICATIONS

Xue, et al., "Structure, hydrogen storage, and luminescence properties of three 3D metal—organic frameworks and NbO and PtS topologies," *Crystal Growth & Design*, 8:2478-83, 2008.

Yang and Zhong, "Molecular simulation of carbon dioxide/methane/hydrogen mixture adsorption in metal—organic frameworks," *J. Phys. Chem. B.*, 110:17776-83, 2006.

Yildirim and Hartman, "Direct observation of hydrogen adsorption sites and nanocage formation in metal—organic frameworks," *Phys. Rev. Lett.*, 95:215504, 2005.

Zhang and Chen, "Exceptional framework flexibility and sorption behavior of a multifunctional porous cuprous triazolate framework," *J. Am. Chem. Soc.*, 130:6010-7, 2008.

Zhang and Chen, "Optimized acetylene/carbon dioxide sorption in a dynamic porous crystal," *J. Am. Chem. Soc.*, 131:5516-21, 2009.

Zhang and Kitagawa, "Supramolecular isomerism, framework flexibility, unsaturated metal center, and porous property of Ag(I)/Cu(I) 3,3',5,5'-tetrametyl-4,4'-bipyrazolate," *J. Am. Chem. Soc.*, 130:907-17, 2008.

Zhang, et al., "A highly connected porous coordination polymer with unusual chnnel structure and sorption properties," *Angew. Chem. Int. Ed.*, 48:5287-90, 2009.

Zhang, et al., "Versatile structure-direction roles a deep-eutectic solvents and their implication in the generation of porosity and open metal sites for gas storage," *Angew. Chem. Int. Ed.*, 48:3486-90, 2009.

Zhang, et al., "Zeolitic boron imidazolate frameworks," *Angew. Chem. Int. Ed. Engl.*, 48:2542-5, 2009.

Zhao, et al., "Hysteretic adsorption and desorption of hydrogen by nanoporous metal—organic frameworks," *Science*, 306:1012-5, 2004.

Zhou and Yildirim, "Nature and tunability of enhanced hydrogen binding in metal—organic frameworks with exposed transition metal sites," *J. Phys. Chem. C*, 112:8132, 2008.

Zhou, et al., "Enhanced H2 adsorption in isostructural metal—organic frameworks with open metal sites: strong dependence of the binding strength on metal ions," *J. Am. Chem. Soc.*, 130:15268-9, 2008.

Bae, et al., "Separation of gas mixtures using Co(II) carborane-based porous coordination polymers," *Chem. Commun.*, 46:3478-80, 2010.

Chen, et al., "Porous Cu—Cd mixed-metal—organic frameworks constructed from Cu(Pyac)2 [Bis[3-(4-pyridyl)pentane-2,4-dionato]copper(II)]," *Inorg. Chem.*, 43:8209-11, 2004.

Cho, et al., "A metal—organic framework material that functions as an enantioselective catalyst for olefin epoxidation," *Chem. Commun.* pp. 2563-2565, 2006.

Deng, et al., "Multiple functional groups of varying ratios in metal—organic frameworks," *Science*, 327:846-50, 2010.

Devic, et al., "Functionalization in flexible porous solids: effects on the pore opening and the host-guest interactions," *J. Am. Chem Soc.*, 132:1127-36, 2010.

Dubbeldam, et al., "Separation and molecular-level segregation of complex alkane mixtures in metal—organic frameworks," *J. Am. Chem. Soc.*, 130:10884-5, 2008.

Dybtsev, et al., "Microporous manganese formate: a simple metal—organic porous material with high framework stability and highly selective gas sorption properties," *J. Am. Chem. Soc.*, 126:32-3, 2004.

Eddaoudi, et al., "Highly porous and stable metal—organic framework: structure design and sorption properties," *J. Am. Chem. Soc.*, 122:1391-7, 2000.

Fang, et al., "Microporous metal—organic framework constructed from heptanuclear zinc carboxylate secondary building units," *Chem. Eur. J.*, 12:3754-8, 2006.

Finsy, et al., "Pore-filling-dependent selectivity effects in the vapor-phase separation of xylene isomers on the metal-organic framework MIL-47," *J. Am. Chem. Soc.*, 130:7110-8, 2008.

Horike, et al., "Soft porous crystals," *Nat. Chem.*, 1:695-704, 2009.

Kitaura, et al., "Immobilization of a metallo schiff base into a microporous coordination polymer," *Angew. Chem. Int. Ed. Engl.*, 43:2684-7, 2004.

Kunznicki, et al., "A titanosilicate molecular sieve with adjustable pores for size-selective adsorption of molecules," *Nature*, 412:720-4, 2001.

Li, et al., "Zeolitic imidazolate frameworks for kinetic separation of propane and propene" *J. Am. Chem. Soc.*, 131:10368-9, 2009.

Liu, et al., "Engineering homochiral metal—organic frameworks for heterogeneous asymmetric catalysis and enantioselective separation," *Adv. Mater.*, 22:4112-35, 2010.

Ma, et al., "Preparation and gas adsorption studies of three mesh-adjustable molecular sieves with a common structure," *J. Am. Chem. Soc.*, 131:6445-51, 2009.

Ma, et al., "A series of isoreticular chiral metal—organic frameworks as a tunable platform for asymmetric catalysis," *Nat. Chem.*, 2:838-46, 2010.

Morris and Bu, "Induction of chiral porous solids containing only achiral building blocks," *Nat. Chem.*, 2:353-61, 2010.

Murray, et al., "Highly-selective and reversible $O_2$ binding in $Cr_3$(1,3,5-benzenetricarboxylate)$_2$," *J. Am. Chem. Soc.*, 132:7856-7, 2010.

Nuzhdin, et al., "Enantioselective chromatographic resolution and one-pot synthesis of enantiomerically pure sulfoxides over a homochiral Zn-organic framework," *J. Am. Chem. Soc.*, 129:12958-9, 2007.

O'Keeffe, et al., "The Reticular Chemistry Structure Resource (RCSR) database of, and symbols for, crystal nets," *Acc. Chem. Res.*, 41:1782-9, 2008.

Rabone, et al., "An adaptable peptide-based porous material," *Science*, 329:1053-7, 2010.

Shimomura, et al., "Selective sorption of oxygen and nitric oxide by an electron-donating flexible porous coordination polymer," *Nat. Chem.*, 2:633-7, 2010.

Vaidhyanathan, et al., "A family of nanoporous materials based on an amino acid backbone," *Angew. Chem. Int. Ed. Engl.*, 45:6495-9, 2006.

Xie, et al., "Porous phosphorescent coordination polymers for oxygen sensing," *J. Am. Chem. Soc.*, 132:922-3, 2010.

Yang, et al., "Cation-induced kinetic trapping and enhanced hydrogen adsorption in a modulated anionic metal—organic framework," *Nat. Chem.*, 1:487-93, 2009.

\* cited by examiner

FIGS. 1(a)-(f)

ACETYLENE STORAGE USING METAL-ORGANIC FRAMEWORKS WITH OPEN METAL SITES

This invention was made with government support under grant number CHE 0718281 awarded by the National Science Foundation. The government has certain rights in the invention.

This application is a national phase application under 35 U.S.C. §371 of International Application No. PCT/US2010/023773 filed 10 Feb. 2010. The entire content of the above-referenced application is specifically incorporated herein by reference without disclaimer.

BACKGROUND OF THE INVENTION

I. Field of the Invention

The present disclosure relates generally to the fields of chemistry and materials science. More particularly, it concerns metal-organic frameworks with open metal sites, compositions thereof and methods use thereof, including acetylene storage.

II. Description of Related Art

Acetylene is a very important raw material for various industrial chemicals, consumer products and for oxy-acetylene cutting in metal fabrication shops. The realization of improvements in high-density acetylene storage media are desirable. Suitable goals include increased storage capacity, safer handling, storage and transportation (Stang and Diederich, 1995; Chien, 1984).

With the realization of open structures and permanent porosity in some prototype metal-organic frameworks (MOFs) such as MOF-5 and HKUST-1 (Li et al., 1999; Chui et al., 1999), research attention have been paid to the implementation of functional sites within MOFs for their specific recognition and thus functional properties. By immobilizing open metal sites, Lewis acidic and basic sites into the pore surfaces of MOFs, a series of unique MOFs have been developed for gas storage, separation, catalysis and sensing (Rieter et al., 2008; Chandler et al., 2006; Mulfort and Hupp, 2007; Lan et al., 2009; Yildirim and Hartman, 2005; Peterson et al., 2006; Dinca et al., 2006; Zhou and Yildirim, 2008; Zhou et al., 2008; Wu et al., 2009; Liu et al., 2008; Ma et al., 2008; Caskey et al., 2008; Zhang et al., 2008; Lin et al., 2009; Xiao et al., 2007; Chen et al., 2008a; Chen et al., 2008b Couck et al., 2009). Because of the very explosive nature of acetylene, the nature of the interaction between specific sites within porous materials and acetylene molecules may be important for to achieve high acetylene storage at room temperature and under a pressure of 0.2 MPa (the compression limit for the safe storage of acetylene) (Budavari, 1996).

Previous efforts on porous materials and MOFs for acetylene storage have been mainly focused on those with small pores to enhance their acetylene adsorption enthalpies which have limited their uptake capacities, with the highest one of 106 cm³/g ever reported (Reid and Thomas, 1999; Reid and Thomas, 2001; Matsuda et al., 2005; Thallapally et al., 2006; Samsonenko et al., 2007; Tanaka et al., 2008; Zhang and Kitagawa, 2008; Samsonenko et al., 2008; WO 2008/000694; Zhang and Chen, 2009). Accordingly, identifying and developing methods and compositions that overcome these limitations are desirable.

SUMMARY OF THE INVENTION

The present disclosure provides acetylene storage materials comprising metal organic frameworks with open metal sites and acetylene. Also provided are new methods of storing acetylene using metal organic frameworks with open metal sites.

In one aspect, the disclosure provides a method of storing acetylene comprising:
(a) obtaining a metal-organic framework (MOF) comprising
  a plurality of metal ions;
  a plurality of open metal sites;
  a plurality of multidentate organic linkers bound to one or more of the metal ions; and
  a plurality of pores; and
(b) combining the MOF with acetylene.

In another aspect, the disclosure provides acetylene storage material comprising:
(a) a metal-organic framework (MOF) comprising
  a plurality of metal ions;
  a plurality of open metal sites;
  a plurality of multidentate organic linkers bound to one or more of the metal ions; and
  a plurality of pores; and
(b) acetylene.

In some embodiments of either of the above aspects, the pores have a multimodal size distribution. In some embodiments, one or more pores has a diameter from 3 Å to 20 Å. In some embodiments, one or more of the pores has a diameter from 5 Å to 11 Å.

In some embodiments of either of the above aspects, the MOF further comprises an interpenetrating metal-organic framework.

In some embodiments of either of the above aspects, one or more of the multidentate organic linkers has 6 to 12 carbon atoms, at least some of which are part of an aromatic ring or non-aromatic ring system. In some embodiments, one or more of the multidentate organic linkers has 12 to 24 carbon atoms, at least some of which are part of an aromatic ring or non-aromatic ring system. In some embodiments, one or more of the multidentate organic linkers is selected from the group consisting of:

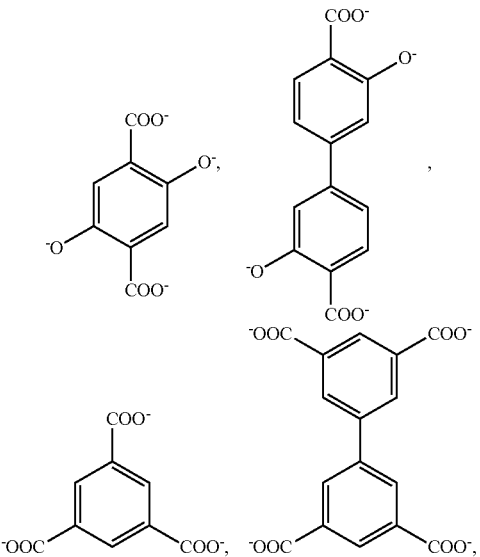

-continued

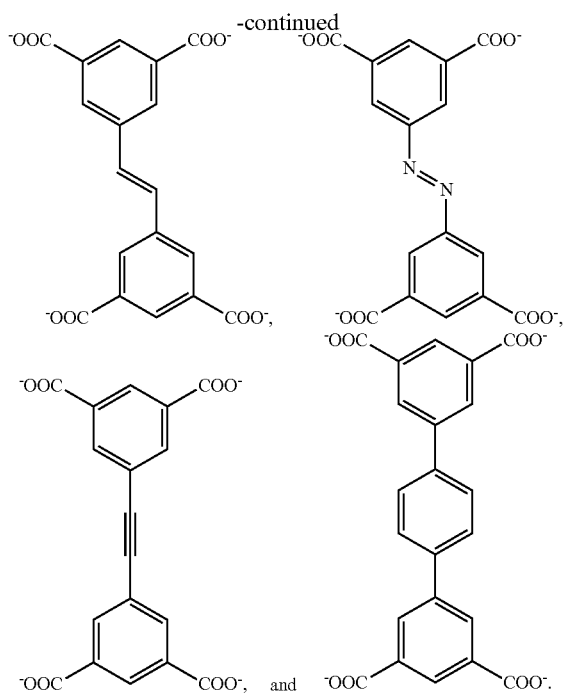

In some embodiments of either of the above aspects, the metal ion is selected from the group comprising of $Li^+$, $Na^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$. For example, in some variants one or more of the metal ions is $Cu^{2+}$. In some variants, substantially all of the metal ions are $Cu^{2+}$.

In some embodiments of either of the above aspects, the MOF is HKUST-1. In some embodiments, the MOF is MOF-505.

In some embodiments of either of the above aspects, the acetylene is absorbed by the MOF in an amount greater than 100 cm³/g at 295 K and 1 atm of acetylene pressure. In some variants thereof, the acetylene is absorbed by the MOF in an amount greater than 140 cm³/g at 295 K and 1 atm of acetylene pressure. In further variants thereof, the acetylene is absorbed by the MOF in an amount greater than 190 cm³/g at 295 K and 1 atm of acetylene pressure.

In some embodiments of either of the above aspects, greater than 1.5 acetylene molecules are absorbed per metal ion.

In some embodiments of either of the above aspects, one or more of the hydrogens atoms of the acetylene are deuterium.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present disclosure. The invention may be better understood by reference to one of these drawings in combination with the detailed description of specific embodiments presented herein.

FIG. 1(a) shows the structure of HKUST-1, FIG. 1(b) shows the structure of MOF-505, FIG. 1(c) shows the structure of MOF-508, FIG. 1(d) shows the structure of MIL-53, FIG. 1(e) shows the structure of MOF-5, and FIG. 1(f) shows the structure of ZIF-8, showing open $Cu^{2+}$ sites (green), 3D frameworks and corresponding pore/cage sizes. The largest spheres in FIGS. 1(a),(b),(e)&(f) correspond to pores.

DESCRIPTION OF ILLUSTRATIVE EMBODIMENTS

Figure 1:
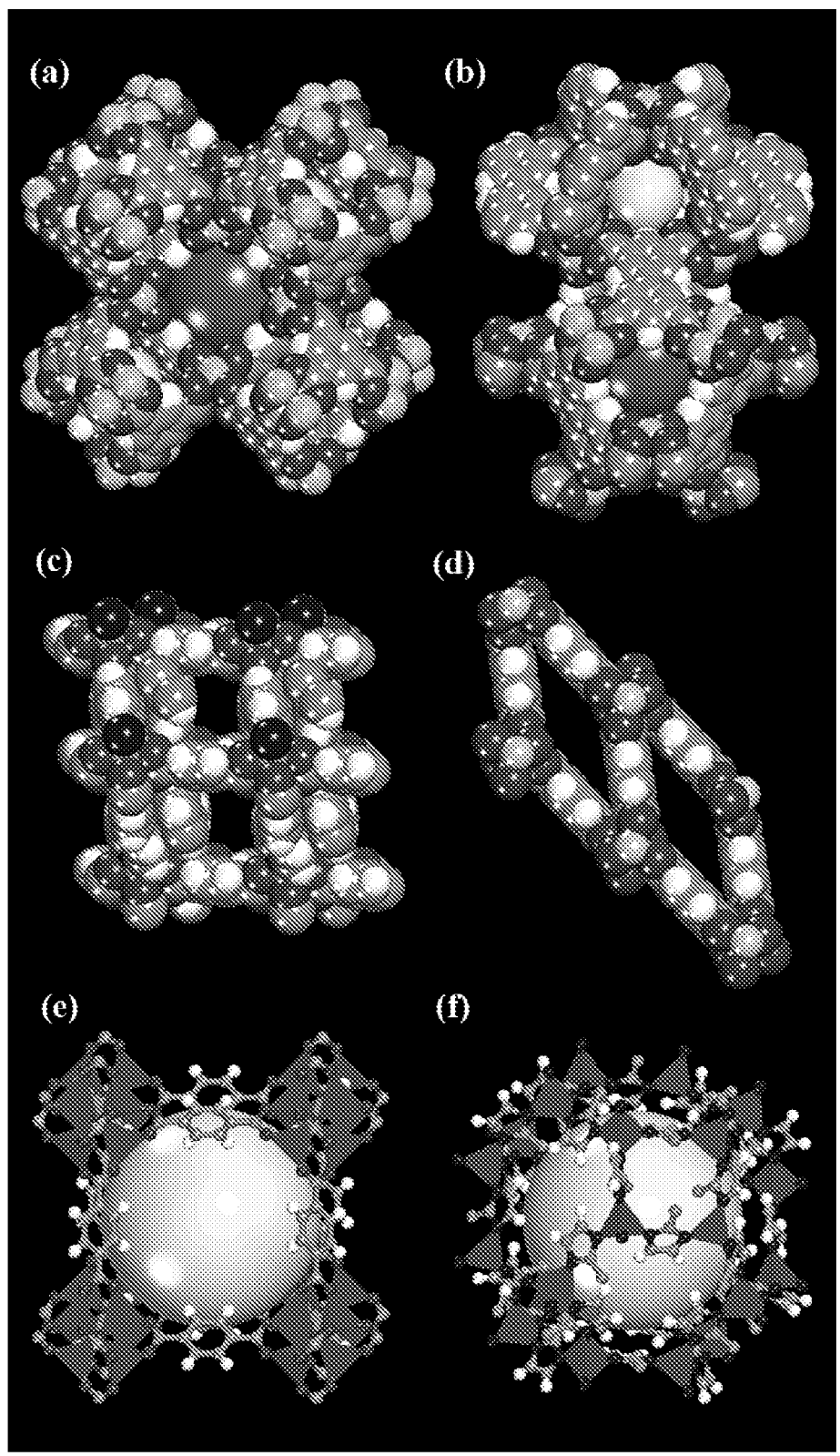
FIGS. 1(a)-(f). Single-Crystal X-ray Structures of Metal-Organic Frameworks.

Disclosed herein are metal organic frameworks with open metal sites useful for acetylene storage and compositions thereof.

I. Definitions

"Metal-organic frameworks" (MOFs) are framework materials self-assembled by the coordination of metal ions with organic linkers exhibiting porosity, typically established by gas adsorption.

"Open metal sites" are defined as unsaturated metal sites having at least one site for further binding of gas molecules. Examples of metal-organic frameworks with open metal sites include HKUST-1 and MOF-505. These materials are further described below.

"Pores" in the context of metal-organic frameworks are defined as open space within the MOFs; pores become available, when the MOF is activated for the storage of gas molecules. Activation can be achieved by heating, e.g., to remove solvent molecules.

"Multimodal size distribution" is defined as pore size distribution in three dimensions.

"Interpenetrating metal-organic framework" is defined as metal-organic frameworks interlocked with each other.

"Multidentate organic linker" is defined as ligand having several binding sites for the coordination to one or more metal ions.

HKUST-1 corresponds to the formula $[Cu_3(TMA)_2(H_2O)_3]_n$ where TMA is benzene-1,3,5-tricarboxylate and n designates repetition of the formula within the brackets as well as the polymeric nature of the material.

MOF-505 corresponds to the formula $[Cu_2(BPTC)(H_2O)_2]_n$ where BPTC is 3,3',5,5'-biphenyltetracarboxylate and n designates repetition of the formula within the brackets as well as the polymeric nature of the material.

MOF-508 corresponds to the formula $[Zn_2(BDC)_2(4,4'-Bipy)]_n$ where BDC is Benzene-1,4-dicarboxylate; 4,4'-

Bipy=4,4'-Bipyridyl and n designates repetition of the formula within the brackets as well as the polymeric nature of the material.

MIL-53 corresponds to the formula $[Al(OH)(BDC)]_n$ where BDC and n are defined as above.

MOF-5 corresponds to the formula $[Zn_4O(BDC)_3]_n$ where BDC and n are defined as above.

ZIF-8 corresponds to the formula $[Zn(MeIM)_2]_n$ where H-MeIM is 2-methylimidazole and n is defined above.

When used in the context of a chemical group, "hydrogen" means —H; "hydroxy" means —OH; "oxo" means =O; "halo" means independently —F, —Cl, —Br or —I; "amino" means —$NH_2$ (see below for definitions of groups containing the term amino, e.g., alkylamino); "hydroxyamino" means —NHOH; "nitro" means —$NO_2$; imino means =NH (see below for definitions of groups containing the term imino, e.g., alkylimino); "cyano" means —CN; "azido" means —$N_3$; in a monovalent context "phosphate" means —OP(O)$(OH)_2$ or a deprotonated form thereof; in a divalent context "phosphate" means —OP(O)(OH)O— or a deprotonated form thereof; "mercapto" means —SH; "thio" means =S; "thioether" means —S—; "sulfonamido" means —$NHS(O)_2$— (see below for definitions of groups containing the term sulfonamido, e.g., alkylsulfonamido); "sulfonyl" means —$S(O)_2$— (see below for definitions of groups containing the term sulfonyl, e.g., alkylsulfonyl); "sulfinyl" means —S(O)— (see below for definitions of groups containing the term sulfinyl, e.g., alkylsulfinyl); and "silyl" means —$SiH_3$ (see below for definitions of group(s) containing the term silyl, e.g., alkylsilyl).

The symbol "—" means a single bond, "=" means a double bond, and "≡" means triple bond. The symbol "═══" represents a single bond or a double bond. The symbol " $\sim\sim\sim$ ", when drawn perpendicularly across a bond indicates a point of attachment of the group. It is noted that the point of attachment is typically only identified in this manner for larger groups in order to assist the reader in rapidly and unambiguously identifying a point of attachment. The symbol " ◂▬ " means a single bond where the group attached to the thick end of the wedge is "out of the page." The symbol " ◁▥ " means a single bond where the group attached to the thick end of the wedge is "into the page". The symbol " $\sim\sim\sim$ " means a single bond where the conformation is unknown (e.g., either R or S), the geometry is unknown (e.g., either E or Z) or the compound is present as mixture of conformation or geometries (e.g., a 50%/50% mixture).

For the groups below, the following parenthetical subscripts further define the groups as follows: "(Cn)" defines the exact number (n) of carbon atoms in the group. "(C≤n)" defines the maximum number (n) of carbon atoms that can be in the group, with the minimum number of carbon atoms in such at least one, but otherwise as small as possible for the group in question, e.g., it is understood that the minimum number of carbon atoms in the group "alkenyl$_{(C≤8)}$" is two. For example, "alkoxy$_{(C≤10)}$" designates those alkoxy groups having from 1 to 10 carbon atoms (e.g., 1, 2, 3, 4, 5, 6, 7, 8, 9, or 10, or any range derivable therein (e.g., 3 to 10 carbon atoms). (Cn-n') defines both the minimum (n) and maximum number (n') of carbon atoms in the group. Similarly, "alkyl$_{(C2-10)}$" designates those alkyl groups having from 2 to 10 carbon atoms (e.g., 2, 3, 4, 5, 6, 7, 8, 9, or 10, or any range derivable therein (e.g., 3 to 10 carbon atoms)).

The term "alkyl" when used without the "substituted" modifier refers to a non-aromatic monovalent group with a saturated carbon atom as the point of attachment, a linear or branched, cyclo, cyclic or acyclic structure, no carbon-carbon double or triple bonds, and no atoms other than carbon and hydrogen. The groups, —$CH_3$ (Me), —$CH_2CH_3$ (Et), —$CH_2CH_2CH_3$ (n-Pr), —$CH(CH_3)_2$ (iso-Pr), —$CH(CH_2)_2$ (cyclopropyl), —$CH_2CH_2CH_2CH_3$ (n-Bu), —$CH(CH_3)$$CH_2CH_3$ (sec-butyl), —$CH_2CH(CH_3)_2$ (iso-butyl), —$C(CH_3)_3$ (tert-butyl), —$CH_2C(CH_3)_3$ (neo-pentyl), cyclobutyl, cyclopentyl, cyclohexyl, and cyclohexylmethyl are non-limiting examples of alkyl groups. The term "substituted alkyl" refers to a non-aromatic monovalent group with a saturated carbon atom as the point of attachment, a linear or branched, cyclo, cyclic or acyclic structure, no carbon-carbon double or triple bonds, and at least one atom independently selected from the group consisting of N, O, F, Cl, Br, I, Si, P, and S. The following groups are non-limiting examples of substituted alkyl groups: —$CH_2OH$, —$CH_2Cl$, —$CH_2Br$, —$CH_2SH$, —$CF_3$, —$CH_2CN$, —$CH_2C(O)H$, —$CH_2C(O)$OH, —$CH_2C(O)OCH_3$, —$CH_2C(O)NH_2$, —$CH_2C(O)$$NHCH_3$, —$CH_2C(O)CH_3$, —$CH_2OCH_3$, —$CH_2OCH_2CF_3$, —$CH_2OC(O)CH_3$, —$CH_2NH_2$, —$CH_2NHCH_3$, —$CH_2N$$(CH_3)_2$, —$CH_2CH_2Cl$, —$CH_2CH_2OH$, —$CH_2CF_3$, —$CH_2CH_2OC(O)CH_3$, —$CH_2CH_2NHCO_2C(CH_3)_3$, and —$CH_2Si(CH_3)_3$.

The term "alkenyl" when used without the "substituted" modifier refers to a monovalent group with a nonaromatic carbon atom as the point of attachment, a linear or branched, cyclo, cyclic or acyclic structure, at least one nonaromatic carbon-carbon double bond, no carbon-carbon triple bonds, and no atoms other than carbon and hydrogen. Non-limiting examples of alkenyl groups include: —CH=$CH_2$ (vinyl), —CH=CH$CH_3$, —CH=CH$CH_2CH_3$, —$CH_2$CH=$CH_2$ (allyl), —$CH_2$CH=CH$CH_3$, and —CH=CH—$C_6H_5$. The term "substituted alkenyl" refers to a monovalent group with a nonaromatic carbon atom as the point of attachment, at least one nonaromatic carbon-carbon double bond, no carbon-carbon triple bonds, a linear or branched, cyclo, cyclic or acyclic structure, and at least one atom independently selected from the group consisting of N, O, F, Cl, Br, I, Si, P, and S. The groups, —CH=CHF, —CH=CHCl and —CH=CHBr, are non-limiting examples of substituted alkenyl groups.

The term "alkynyl" when used without the "substituted" modifier refers to a monovalent group with a nonaromatic carbon atom as the point of attachment, a linear or branched, cyclo, cyclic or acyclic structure, at least one carbon-carbon triple bond, and no atoms other than carbon and hydrogen. The groups, —C≡CH, —C≡C$CH_3$, —C≡C$C_6H_5$ and —$CH_2$C≡C$CH_3$, are non-limiting examples of alkynyl groups. The term "substituted alkynyl" refers to a monovalent group with a nonaromatic carbon atom as the point of attachment and at least one carbon-carbon triple bond, a linear or branched, cyclo, cyclic or acyclic structure, and at least one atom independently selected from the group consisting of N, O, F, Cl, Br, I, Si, P, and S. The group, —C≡CSi$(CH_3)_3$, is a non-limiting example of a substituted alkynyl group.

The term "aryl" when used without the "substituted" modifier refers to a monovalent group with an aromatic carbon atom as the point of attachment, said carbon atom forming part of one or more six-membered aromatic ring structure(s) wherein the ring atoms are all carbon, and wherein the monovalent group consists of no atoms other than carbon and hydrogen. Non-limiting examples of aryl groups include phenyl (Ph), methylphenyl, (dimethyl)phenyl, —$C_6H_4CH_2CH_3$ (ethylphenyl), —$C_6H_4CH_2CH_2CH_3$ (propylphenyl), —$C_6H_4CH(CH_3)_2$, —$C_6H_4CH(CH_2)_2$, —$C_6H_3(CH_3)$$CH_2CH_3$ (methylethylphenyl), —$C_6H_4CH$=$CH_2$ (vinylphenyl), —$C_6H_4CH$=CH$CH_3$, —$C_6H_4C$≡CH, —$C_6H_4C$≡C$CH_3$, naphthyl, and the monovalent group derived from biphenyl. The term "substituted aryl" refers to a monovalent group with an aromatic carbon atom as the point of attachment, said carbon atom forming part of one or more six-membered aromatic ring structure(s) wherein the ring atoms are all carbon, and wherein the monovalent group further has at least one atom independently selected from the group consisting of N, O, F, Cl, Br, I, Si, P, and S. Non-limiting examples of substituted aryl groups include the groups: $C_6H_4F$, $C_6H_4Cl$, —$C_6H_4Br$, $C_6H_4I$, —$C_6H_4OH$, —$C_6H_4OCH_3$, —$C_6H_4OCH_2CH_3$, —$C_6H_4OC(O)CH_3$, —$C_6H_4NH_2$, —$C_6H_4NHCH_3$, —$C_6H_4N(CH_3)_2$, —$C_6H_4CH_2OH$, —$C_6H_4CH_2OC(O)CH_3$, —$C_6H_4CH_2NH_2$, —$C_6H_4CF_3$, —$C_6H_4CN$, $C_6H_4CHO$, $C_6H_4CHO$, —$C_6H_4C(O)CH_3$, $C_6H_4C(O)C_6H_5$, —$C_6H_4CO_2H$, —$C_6H_4CO_2CH_3$, —$C_6H_4CONH_2$, —$C_6H_4CONHCH_3$, and —$C_6H_4CON(CH_3)_2$.

The term "heteroaryl" when used without the "substituted" modifier refers to a monovalent group with an aromatic carbon atom or nitrogen atom as the point of attachment, said carbon atom or nitrogen atom forming part of an aromatic ring structure wherein at least one of the ring atoms is nitrogen, oxygen or sulfur, and wherein the monovalent group consists of no atoms other than carbon, hydrogen, aromatic nitrogen, aromatic oxygen and aromatic sulfur. Non-limiting examples of aryl groups include acridinyl, furanyl, imidazoimidazolyl, imidazopyrazolyl, imidazopyridinyl, imidazopyrimidinyl, indolyl, indazolinyl, methylpyridyl, oxazolyl, phenylimidazolyl, pyridyl, pyrrolyl, pyrimidyl, pyrazinyl, quinolyl, quinazolyl, quinoxalinyl, tetrahydroquinolinyl, thienyl, triazinyl, pyrrolopyridinyl, pyrrolopyrimidinyl, pyrrolopyrazinyl, pyrrolotriazinyl, pyrroloimidazolyl, chromenyl (where the point of attachment is one of the aromatic atoms), and chromanyl (where the point of attachment is one of the aromatic atoms). The term "substituted heteroaryl" refers to a monovalent group with an aromatic carbon atom or nitrogen atom as the point of attachment, said carbon atom or nitrogen atom forming part of an aromatic ring structure wherein at least one of the ring atoms is nitrogen, oxygen or sulfur, and wherein the monovalent group further has at least one atom independently selected from the group consisting of non-aromatic nitrogen, non-aromatic oxygen, non aromatic sulfur F, Cl, Br, I, Si, and P.

The term "acyl" when used without the "substituted" modifier refers to a monovalent group with a carbon atom of a carbonyl group as the point of attachment, further having a linear or branched, cyclo, cyclic or acyclic structure, further having no additional atoms that are not carbon or hydrogen, beyond the oxygen atom of the carbonyl group. The groups, —CHO, —$C(O)CH_3$ (acetyl, Ac), —$C(O)CH_2CH_3$, —$C(O)CH_2CH_2CH_3$, —$C(O)CH(CH_3)_2$, —$C(O)CH(CH_2)_2$, —$C(O)C_6H_5$, —$C(O)C_6H_4CH_3$, —$C(O)C_6H_4CH_2CH_3$, —$COC_6H_3(CH_3)_2$, and —$C(O)CH_2C_6H_5$, are non-limiting examples of acyl groups. The term "acyl" therefore encompasses, but is not limited to groups sometimes referred to as "alkyl carbonyl" and "aryl carbonyl" groups. The term "substituted acyl" refers to a monovalent group with a carbon atom of a carbonyl group as the point of attachment, further having a linear or branched, cyclo, cyclic or acyclic structure, further having at least one atom, in addition to the oxygen of the carbonyl group, independently selected from the group consisting of N, O, F, Cl, Br, I, Si, P, and S. The groups, —$C(O)CH_2CF_3$, —$CO_2H$ (carboxyl), —$CO_2CH_3$ (methylcarboxyl), —$CO_2CH_2CH_3$, —$CO_2CH_2CH_2CH_3$, $CO_2C_6H_5$, $CO_2CH(CH_3)_2$, —$CO_2CH(CH_2)_2$, —$C(O)NH_2$ (carbamoyl), —$C(O)NHCH_3$, —$C(O)NHCH_2CH_3$, —$CONHCH(CH_3)_2$, —$CONHCH(CH_2)_2$, —$CON(CH_3)_2$, —$CONHCH_2CF_3$, —CO-pyridyl, —CO-imidazoyl, and —$C(O)N_3$, are non-limiting examples of substituted acyl groups. The term "substituted acyl" encompasses, but is not limited to, "heteroaryl carbonyl" groups.

The term "alkoxy" when used without the "substituted" modifier refers to the group —OR, in which R is an alkyl, as that term is defined above. Non-limiting examples of alkoxy groups include: —$OCH_3$, —$OCH_2CH_3$, —$OCH_2CH_2CH_3$, —$OCH(CH_3)_2$, —$OCH(CH_2)_2$, —O-cyclopentyl, and —O-cyclohexyl. The term "substituted alkoxy" refers to the group —OR, in which R is a substituted alkyl, as that term is defined above. For example, —$OCH_2CF_3$ is a substituted alkoxy group.

The term "alkylamino" when used without the "substituted" modifier refers to the group —NHR, in which R is an alkyl, as that term is defined above. Non-limiting examples of alkylamino groups include: —$NHCH_3$, —$NHCH_2CH_3$, —$NHCH_2CH_2CH_3$, —$NHCH(CH_3)_2$, —$NHCH(CH_2)_2$, —$NHCH_2CH_2CH_2CH_3$, —$NHCH(CH_3)CH_2CH_3$, —$NHCH_2CH(CH_3)_2$, —$NHC(CH_3)_3$, —NH-cyclopentyl, and —NH-cyclohexyl. The term "substituted alkylamino" refers to the group —NHR, in which R is a substituted alkyl, as that term is defined above. For example, —$NHCH_2CF_3$ is a substituted alkylamino group.

The term "dialkylamino" when used without the "substituted" modifier refers to the group —NRR', in which R and R' can be the same or different alkyl groups, or R and R' can be taken together to represent an alkanediyl having two or more saturated carbon atoms, at least two of which are attached to the nitrogen atom. Non-limiting examples of dialkylamino groups include: —$NHC(CH_3)_3$, —$N(CH_3)CH_2CH_3$, —$N(CH_2CH_3)_2$, N-pyrrolidinyl, and N-piperidinyl. The term "substituted dialkylamino" refers to the group —NRR', in which R and R' can be the same or different substituted alkyl groups, one of R or R' is an alkyl and the other is a substituted alkyl, or R and R' can be taken together to represent a substituted alkanediyl with two or more saturated carbon atoms, at least two of which are attached to the nitrogen atom.

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$. Similarly, it is contemplated that one or more carbon atom(s) of a compound of the present invention may be replaced by a silicon atom(s). Furthermore, it is contemplated that one or more oxygen atom(s) of a compound of the present invention may be replaced by a sulfur or selenium atom(s).

Any undefined valency on an atom of a structure shown in this application implicitly represents a hydrogen atom bonded to the atom.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes"

one or more steps is not limited to possessing only those one or more steps and also covers other unlisted steps.

The term "effective," as that term is used in the specification and/or claims, means adequate to accomplish a desired, expected, or intended result.

The term "hydrate" when used as a modifier to a compound means that the compound has less than one (e.g., hemihydrate), one (e.g., monohydrate), or more than one (e.g., dihydrate) water molecules associated with each compound molecule, such as in solid forms of the compound.

An "isomer" of a first compound is a separate compound in which each molecule contains the same constituent atoms as the first compound, but where the configuration of those atoms in three dimensions differs.

The term "saturated" when referring to an atom means that the atom is connected to other atoms only by means of single bonds.

The above definitions supersede any conflicting definition in any of the reference that is incorporated by reference herein. The fact that certain terms are defined, however, should not be considered as indicative that any term that is undefined is indefinite. Rather, all terms used are believed to describe the invention in terms such that one of ordinary skill can appreciate the scope and practice the present invention.

II. Synthetic Methods

Metal-organic frameworks of the present disclosure may be made using the methods outlined below. These methods can be further modified and optimized using the principles and techniques of chemistry and/or materials science as applied by a person skilled in the art. Such principles and techniques are taught, for example, in Chen et al. (2005), which is incorporated by reference herein.

The following are included to demonstrate preferred embodiments of the invention. It should be appreciated by those of skill in the art that the techniques which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Synthesis of HKUST-1:

A solution of $Cu(NO_3)_2 \cdot (H_2O)_{2.5}$ (0.124 g, 0.532 mmol) and $H_3BTC$ (0.074 g, 0.352 mmol) in the mixture of N,N-dimethylformamide DMF (6 mL)/ethanol (6 mL)/$H_2O$ (6 mL) in a sealed vial (20 mL) at 70° C. for 24 h gave green, cubic microcrystalline crystals of HKUST-1 (120 mg) which were confirmed by powder X-ray diffraction study. The as-synthesized HKUST-1 was exchanged with acetone 10 times (each of 20 mL) and then activated at 120° C. for 24 hrs under high vacuum up to 4 nmHg before BET and acetylene adsorption studies.

Synthesis of MOF-505 (Chen et al., 2005), MOF-508 (Chen et al., 2006) and MOF-5 (Férey et al., 2003):

These were synthesized and activated according to the references. MIL-53 (Eddaoud et al., 2002) and ZIF-8 (Park et al., 2006) were purchased from Aldrich and activated at 150 and 100° C. for 24 hrs under high vacuum up to 4 nmHg, respectively. $N_2$ and acetylene adsorption isotherms were measured on ASAP 2020. As the center-controlled air conditioning was set up at 22.0° C., a water bath of 22.0° C. was used for acetylene adsorption isotherms at 295.0 K.

III. Acetylene Storage Properties of MOFs

Metal-organic frameworks of the present disclosure have been tested for their interactions with acetylene, including, for example, acetylene adsorption, acetylene uptake and release, acetylene storage, and binding of acetylene.

In this regard, prototype microporous MOFs, namely HKUST-1 (Chui et al., 1999), MOF-505 (Chen et al., 2005), MOF-508 (Chen et al., 2006), MIL-53 (Férey et al., 2003), MOF-5 (Eddaoudi et al., 2002) and ZIF-8 (Park et al., 2006) were examined for their acetylene storage. They can be classified into three types of pore structures featuring open metal sites (HKUST-1 and MOF-505), small pores (MOF-508 and MIL-53), and large pores (MOF-5 and ZIF-8), respectively, as shown in FIG. 1.

HKUST-1 has 3D intersectional pores with the window size of 6.9 Å and cage size of 10.8 Å (purple sphere in FIG. 1(a)). Additionally, there are eight small pockets of 5.3 Å (yellow spheres in FIG. 1a) around each cage after the terminal water molecules are removed after the activation (FIG. 1a). MOF-505 features 1D pores in which small cage of 6.0 Å (yellow sphere) and large cage of 9.0 Å (purple sphere) are alternately stacked along c axis (FIG. 1b). MOF-508 and MIL-53 are doubly interpenetrated and rod-packing MOFs, exhibiting 1D straight channel of 4.0×4.0 and 7.7×7.7 Å$^2$, respectively (FIG. 1c-d). MOF-5 (or IRMOF-1) is one of the most highly porous MOFs with very large open 3D pores of about 11.5 Å (FIG. 1e). The representative zeolitic MOF, ZIF-8, has a pore aperture of 3.4 Å and cage size of 11.6 Å (FIG. 10. These microporous MOFs were confirmed by powder X-ray diffraction, and then activated and examined by $N_2$ adsorption to establish their permanent porosity. HKUST-1, MOF-505, MOF-508, MIL-53, MOF-5 and ZIF-8 have Langmuir surface area of 2095, 1694, 946, 1233, 3610 and 1758 m$^2$/g, respectively.

Figure 2:
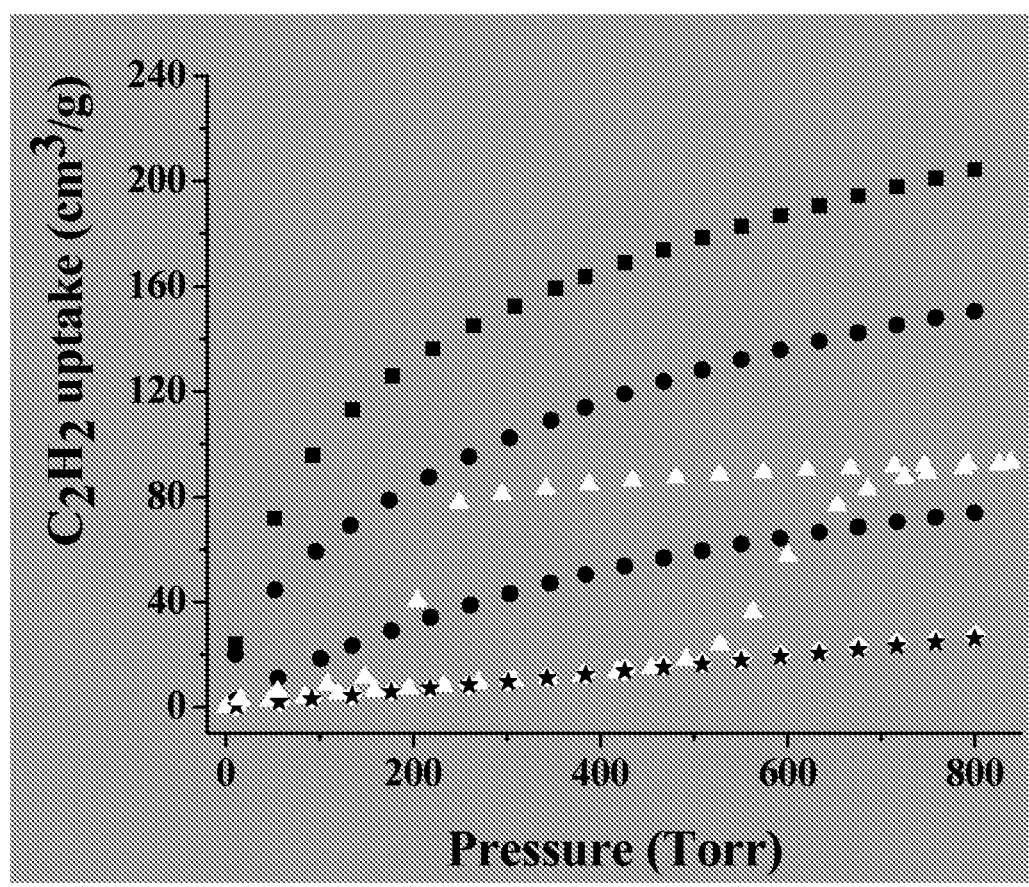
FIG. 2. Acetylene Adsorption Isotherms of Microporous MOFs. With the exception of MOF-508, data points were taken at 295 K. MOF-508 data was taken at 290 K. The data points correspond as follows: HKUST-1 (black squares), MOF-505 (top circles), MOF-508 (bottom triangles), MIL-53 (lower circles), MOF-5 (diamonds) and ZIF-8 (stars).

The acetylene uptake were carried out at 295 K (MOF-508 was examined at 290 K to secure its saturated adsorption at 1 atm). As shown in FIG. 2, those with large pores (MOF-5 and ZIF-8) are certainly not favorable for acetylene storage, although their surface areas are quite high. The ones with small pores (MOF-508 and MIL-53) take up moderate amount of acetylene, which are comparable to those reported (Reid and Thomas, 1999; Reid and Thomas, 2001; Matsuda et al., 2005; Thallapally et al., 2006; Samsonenko et al., 2007; Tanaka et al., 2008; Zhang and Kitagawa, 2008; Samsonenko et al., 2008; WO 2008/000694; Zhang and Chen, 2009). MOF-508 exhibits hysteresis sorption behavior because of the open-dense framework transformation (Chen et al., 2006) and its acetylene uptake can be saturated at low pressure. HKUST-1 and MOF-505 with open $Cu^{2+}$ sites take up significantly larger amount of acetylene of 201 and 148 cm$^3$/g, respectively; at 295 K and 1 atm. The comparison of some microporous MOFs for acetylene storage is listed on Table 1.

TABLE 1

Acetylene Uptake in Six Metal-Organic Frameworks at 295 K and 1 atm (MOF-508 at 290 K).

| MOFs (Langmuir surface area, m$^2$/g) | cm$^3$/g | cm$^3$/cm$^{3[a]}$ | wt % | Density[b] (g/cm$^3$) | P[c] [MPa] |
|---|---|---|---|---|---|
| HKUST-1 (2095) | 201 | 177 | 23.4 | 0.21 | 19.3 |

TABLE 1-continued

Acetylene Uptake in Six Metal-Organic Frameworks
at 295 K and 1 atm (MOF-508 at 290 K).

| MOFs (Langmuir surface area, m$^2$/g) | cm$^3$/g | cm$^3$/cm$^{3[a]}$ | wt % | Density$^{[b]}$ (g/cm$^3$) | P$^{[c]}$ [MPa] |
|---|---|---|---|---|---|
| MOF-505 (1694) | 148 | 137 | 17.2 | 0.16 | 15.0 |
| MOF-508 (946) | 90 | 112 | 10.5 | 0.13 | 12.2 |
| MIL-53 (1233) | 72 | 67 | 8.4 | 0.08 | 7.3 |
| MOF-5 (3610) | 26 | 15 | 3.0 | 0.02 | 1.6 |
| ZIF-8 (1758) | 25 | 23 | 2.9 | 0.03 | 2.5 |

$^{[a]}$The framework density was calculated from single crystal X-ray data (Table S13);
$^{[b]}$Calculated density of adsorbed acetylene in bulk material.
$^{[c]}$Pressure of acetylene at 295 K (290 K for MOF-508) corresponding to the calculated density of adsorbed acetylene in bulk material.

Figure 3:
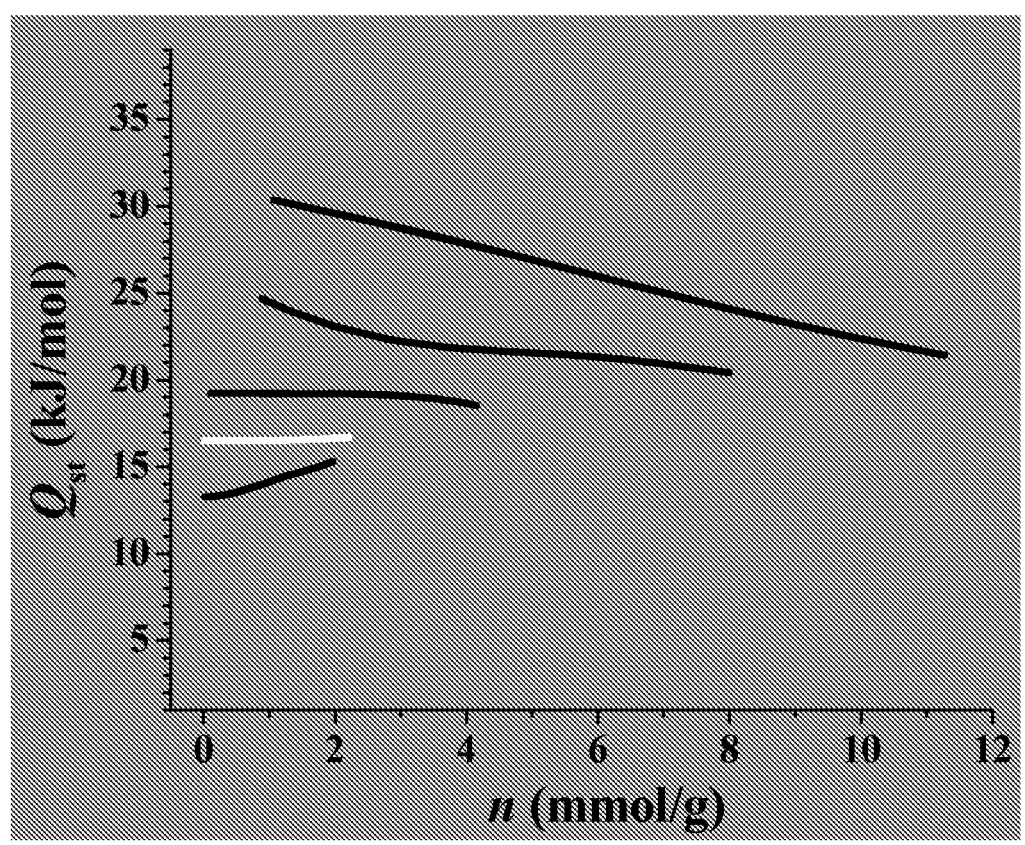
FIG. 3. Coverage Dependencies of Adsorption Enthalpies for $C_2H_2$ in MOFs. These coverage dependencies were calculated from fits of their 273 and 295 K isotherms. HKUST-1 (top curve); MOF-505 ($2^{nd}$ from top curve); MIL-53 (middle curve); MOF-5 ($2^{nd}$ curve from bottom) and ZIF-8 (bottom curve).

Coverage-Dependent Adsorption Enthalpies:

Coverage-dependent adsorption enthalpies of the MOFs to acetylene were calculated based on virial method, a well established and reliable methodology from fits of their adsorption isotherms at 273 and 295 K (Roswell et al., 2006). As shown in FIG. 3, HKUST-1 exhibits the largest adsorption enthalpies of $C_2H_2$ (30.4 kJ/mol at the coverage of 1 mmol/g), while ZIF-8 has the smallest one (13.3 kJ/mol at the coverage of 0.02 mmol/g). As investigated before, the smaller pores favor the stronger interactions between acetylene molecules and pore surfaces. Therefore, MIL-53 has higher adsorption enthalpies than MOF-5 (Tanaka et al., 2008). MOF-5 has stronger interactions with acetylene than ZIF-8, partly because of the stronger C—H it interactions between acetylene and phenyl groups in MOF-5 Busker et al., 2008). The open $Cu^{2+}$ sites within HKUST-1 and MOF-505 significantly enhance their interactions with acetylene molecules (Reisinger et al., 2007), as demonstrated by the comparison of their adsorption enthalpies with those in MIL-53 whose pore sizes (7.7 Å) are in the same range with those in HKUST-1 and MOF-505 (5.3-10.8 Å). Without being bound by theory, the smaller pocket of 5.3 Å (yellow sphere, FIG. 1a) and more dense open $Cu^{2+}$ sites within HKUST-1 might attribute to its stronger interactions with acetylene than MOF-505.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

The following references, and those listed in the Appendix, to the extent that they provide exemplary procedural or other details supplementary to those set forth herein, are specifically incorporated herein by reference.

Budavari, *The Merck Index*, 12$^{th}$ Ed., Merck Research Laboratories, NY, p. 16, 1996.
Busker et al., *Angew. Chem. Int. Ed.*, 47:10094, 2008.
Caskey et al., *J. Am. Chem. Soc.*, 130:10870, 2008.
Chandler et al., *J. Am. Chem. Soc.*, 128:10403, 2006.
Chen et al., *Angew. Chem. Int. Ed.*, 44:4745-4749, 2005.
Chen et al., *Angew. Chem. Int. Ed.*, 45:1390, 2006.
Chen et al., *J. Am. Chem. Soc.*, 130:6718, 2008a.
Chen et al., *J. Am. Chem. Soc.*, 130:6411, 2008b.
Chien, In: *Polyacetylene: Chemistry, Physics, and Material Science*, Academic Press, NY, 1984.
Chui et al., *Science*, 283:1148, 1999.
Couck et al., *J. Am. Chem. Soc.*, 131:6326, 2009.
Dinca et al., *J. Am. Chem. Soc.*, 128:16876, 2006.
Eddaoudi et al., *Science*, 295:469, 2002.
Férey et al., *Chem. Commun.*, 2976, 2003.
Lan et al., *Angew. Chem. Int. Ed.*, 48:2334, 2009.
Li et al., *Nature*, 402:276, 1999.
Lin et al., *J. Am. Chem. Soc.*, 131:2159, 2009.
Liu et al., *Langmuir*, 24:4772, 2008.
Ma et al., *J. Am. Chem. Soc.*, 130:1012, 2008.
Matsuda et al., *Nature*, 436:238, 2005.
Mulfort and Hupp, *J. Am. Chem. Soc.*, 129:9604, 2007.
Park et al., *Proc. Natl. Acad. Sci. USA*, 103:10186, 2006.
PCT Appln. WO 2008/000694
Peterson et al., *J. Am. Chem. Soc.*, 128:15578, 2006.
Reid and Thomas, *J. Phys. Chem. B.*, 105:10619, 2001.
Reid and Thomas, *Langmuir*, 15:3206, 1999.
Reisinger et al., *Angew. Chem. Int. Ed.*, 46:8295, 2007.
Rieter et al., *J. Am. Chem. Soc.*, 130:11584, 2008.
Roswell and Yaghi, *J. Am. Chem. Soc.*, 128:1304, 2006.
Samsonenko et al., *Angew. Chem. Int. Ed.*, 47:3352, 2008.
Samsonenko et al., *Chem. Asian J.*, 2:484, 2007.
Stang and Diederich, In: *Modern Acetylene Chemistry*, VCH, NY, 1995.
Tanaka et al., *S. Chem. Asian J.*, 3:1343, 2008.
Thallapally et al., *Angew. Chem. Int. Ed.*, 45:6506, 2006.
Wu et al., *J. Am. Chem. Soc.*, 131:4995, 2009.
Xiao et al., *J. Am. Chem. Soc.*, 129:1203, 2007.
Yildirim and Hartman, *Phys. Rev. Letts.*, 95:215504, 2005.
Zhang and Chen, *J. Am. Chem. Soc.*, 130:6010, 2008.
Zhang and Chen, *J. Am. Chem. Soc.*, 131: 5516, 2009.
Zhang and Kitagawa, *J. Am. Chem. Soc.*, 130:907, 2008.
Zhou and Yildirim, *J. Phys. Chem. C*, 112:8132, 2008.
Zhou et al., *J. Am. Chem. Soc.*, 130:15268, 2008.

The invention claimed is:

1. A method of storing acetylene comprising:
   (a) obtaining a metal-organic framework (MOF), wherein the MOF is HKUST-1 or MOF-505; and
   (b) combining the MOF with acetylene, wherein the acetylene is stored at a pressure greater than 0.2 MPa at room temperature.

2. A method of storing acetylene comprising:
   (a) obtaining a metal-organic framework (MOF), wherein the MOF is HKUST-1 or MOF-505; and
   (b) combining the MOF with acetylene, wherein the acetylene is stored at a pressure between about 15.0 MPa and 19.3 MPa at 295K.

3. A method of storing acetylene comprising:
   (a) obtaining a metal-organic framework (MOF), wherein the MOF is HKUST-1 or MOF-505; and
   (b) combining the MOF with acetylene, where the acetylene is absorbed by the MOF in an amount greater than 100 cm$^3$/g at 295 K and 1 atm of acetylene pressure.

4. The method of claim 3, where the acetylene is absorbed by the MOF in an amount greater than 140 cm$^3$/g at 295 K and 1 atm of acetylene pressure.

5. The method of claim 4, where the acetylene is absorbed by the MOF in an amount greater than 190 cm$^3$/g at 295 K and 1 atm of acetylene pressure.

* * * * *